March 29, 1927.
E. LANDON
1,622,593
VEHICLE WHEEL
Filed May 17, 1926
Fig. 1.
Fig. 2.
Fig. 3.
Fig. 4.
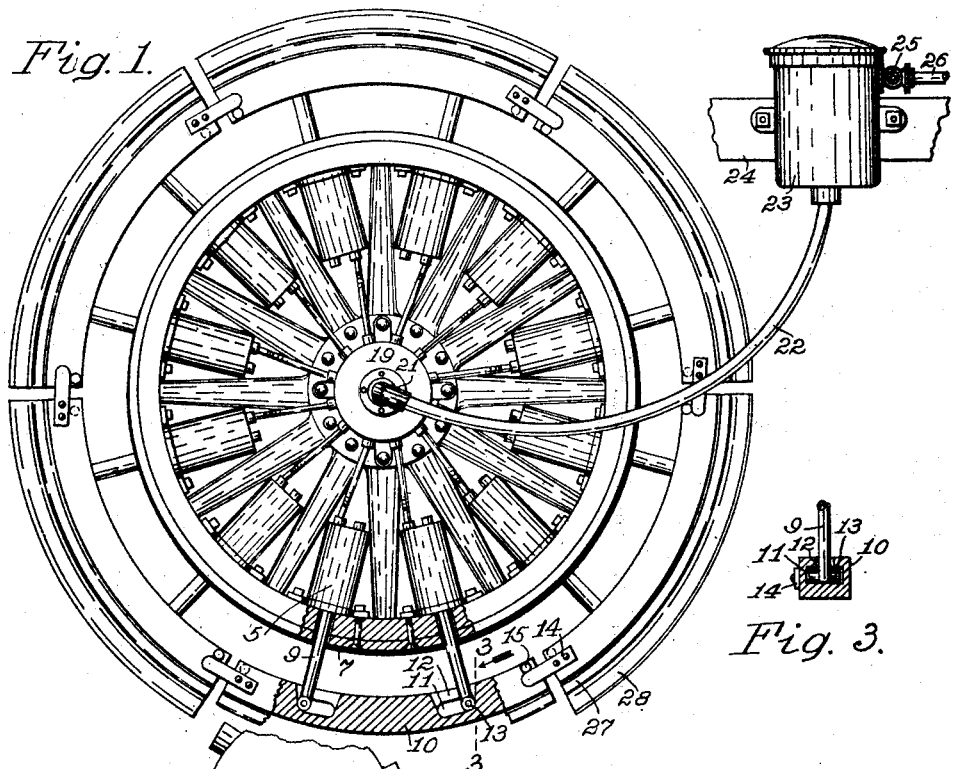
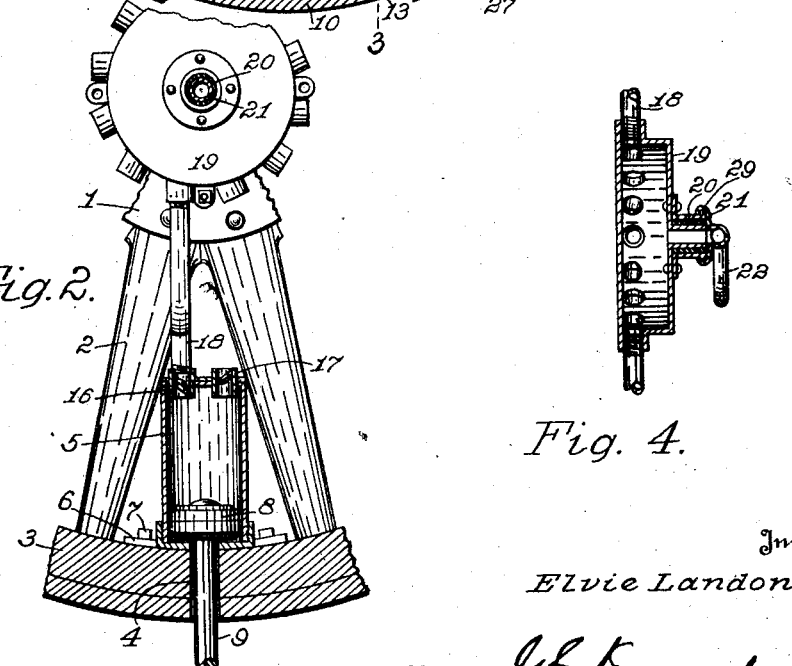
Inventor
Elvie Landon
By G. C. Kennedy
Attorney Patented Mar. 29, 1927.

1,622,593

UNITED STATES PATENT OFFICE.

ELVIE LANDON, OF WATERLOO, IOWA.

VEHICLE WHEEL.

Application filed May 17, 1926. Serial No. 109,738.

My invention relates to improvements in vehicle wheels, and particularly to the carrying wheels of motor driven vehicles, and the object of my improvements is to supply a wheel of this type with a plurality of movable tread members operatively connected to air compressing devices, whereby, while the wheel is cushioned peripherally, the oscillations engendered in the connected parts may be utilized for the storage of power.

With the foregoing and other objects in view which will appear as the description proceeds, the invention resides in the combination, and in the arrangement of parts, as also in the details of construction, hereinafter described and claimed, it being understood that changes in the precise embodiment of invention herein disclosed can be made within the scope of what is claimed without departing from the spirit of the invention.

In the annexed drawings, Fig. 1 is a side elevation of a vehicle wheel constructed according to my invention, with a communicating air storage vessel, parts of both devices being broken away or removed. Fig. 2 is a detail view in side elevation on a larger scale of part of said wheel, with the air compressor shown in central longitudinal section. Fig. 3 is a cross section of one of the tread members taken on the broken line 3—3 of said Fig. 1, looking in the direction indicated by the arrow. Fig. 4 is a detail central cross section of the air gathering chamber on the wheel, taken on the same scale as said Fig. 2.

The body of the vehicle wheel shown is substantially that of a motor vehicle carrying wheel having radiating spokes 2 from a central hub 1, and carrying on the outer ends of the spokes the metal rimmed felly 3. Air-compressor cylinders 5 of a simple construction are mounted between the spokes 2 and have lugs 6 fastened to the felly by bolts 7. The outer centrally apertured head of each cylinder 5 has its aperture in registration with an alined aperture 4 traversing the felly radially, and an imperforate piston 8 in the cylinder has its stem 9 movable through said registering apertures to project outwardly of the felly, terminating outwardly in a cross-pintle carrying on each end an anti-friction roller 13. The numeral 10 denotes an outer tread member, arcuate concentrically with the wheel, segmentally co-operating with the others like it independently movably surrounding said felly circumferentially. There may be any desired number of the members 10. I have shown six of them whereby each tread member is linked operatively to a pair of adjacent compressor pistons 8 by means of said stems 9 and their end rollers 13. This pivotal connection of each stem 9 is effected by providing near each end of a member 10 in its inner face a constricted opening 12 which terminates outwardly in a wider opening 11. The rollers 13 extend rotatably across the wider opening 11 and are retained therein for to and fro movements of the stem 9 along and through the opening 12 to a limited extent according to the oscillations of the tread member relative to the wheel.

Upon the outer tread periphery of each member 10 is secured a segmental metal rim 27 of the "clincher" type to seat and mount securely thereon a segmental solid rubber tire member 28. Cylindrical studs 15 are fixed upon opposite side faces of the members 10, one on each side face, positioned at opposite end parts of the member, as indicated by dotted lines in Fig. 1. As will be seen in the said figure, a projecting pressure finger 14 is fixed on the adjacent end of the near tread member 10 on the same side to cross their interspace and overlie in contact the stud 15 on the off or other paired tread member. On one face of the tread members on the same side of the wheel all the fingers 14 project in the same direction circumferentially, while on the opposite side faces of these members 10 all the fingers 14 project in an opposite direction circumferentially to overlie and contact with other studs 15 on the paired members ends. The fingers are preferably tilted slightly inwardly toward the contacting studs 15.

Referring now to Figs. 2 and 4, the cylinder 5 is provided in its inner head with an inlet-valve 17, and with an outlet valve 16, both of the return check type. A conduit 18 leads from the outlet-valve to and into a drum-shaped gathering chamber 19 positioned centrally over the wheel, and mounted thereon fixedly. The drum or chamber 19 has in its outer face an apertured or tubular nipple surrounded by a spaced concentric sleeve 29 which has a terminal outer annulus. A hollow cap 21 has an inturned rim mounted about the annulus on the sleeve 29 loosely enough to permit the latter to rotate within it freely, while the interspace of the said nipple and said sleeve with said cap is filled with a packing or air-sealing ring or gasket 20 of rubber or other suitable material. A flexible hose 22 is connected to the cap 21 and leads and delivers into a tank 23 mounted on a frame or other part 24 adjacent to the wheel. The tank has an outlet-pipe 26 governed by a cock 25, and said pipe may lead to or deliver to any appliance using compressed air.

It will be seen that when the wheel which is shown as not under load and with all the tread members 10 projected outwardly, is placed under load and rotated, that the particular tread member below the wheel in rotating with the wheel, by means of the forward projection 14 thereon will press upon the stud 15 on the member 10 ahead and as the wheel seeks its lowest level under load, that the tread member ahead is also influenced by said member below, in keeping or attaining such relative positions to the wheel, that the pistons 8 in both pairs of cylinders related to the two tread members will assume upper positions in the cylinders as the cylinders are displaced downwardly with the wheel.

This action will be repeated in succession with all the tread members as the wheel rolls ahead, or in the reverse order in backing up. Air is compressed and driven in and from each cylinder through its valve outlet 16 into the conduit 18 and gathering chamber 19. The latter receives the successive increments from the cylinders, and air under a constant pressure hence escapes by way of the hose 22 to the tank 23, for storage.

The solid rubber tire parts 28 cushion the members 10, and as the members 10 and the pistons 8 return against some air pressure in the cylinders, they are additionally cushioned by this means, so that the wheel is yieldingly supported against shocks.

Having described my invention, what I claim as new, and desire to secure by Letters Patent, is:

1. In combination, a wheel having an apertured felly and tread members positioned concentrically around it, closed cylinders mounted around the wheel, each cylinder having one apertured head and with valve-controlled inlet- and outlet-ports in its opposite head, an imperforate piston in each cylinder with stem projecting through its apertured head and terminally loosely connected to a tread member, a gathering chamber having an outlet-port and having communications with the cylinder outlet-ports, a reservoir, and means of communication between said reservoir and the outlet-port of said gathering chamber.

2. In combination, a wheel having an apertured felly and tread members positioned concentrically around it, each tread member having a longitudinal bearing cavity opening toward a felly aperture by way of a transversely narrowed neck, closed cylinders mounted around the wheel, each cylinder having in its outer head an aperture registering with an aperture in said felly, an imperforate piston in each piston with stem traversing said registering apertures outwardly and having terminal anti-friction rollers mounted in said tread member bearing cavity to roll lengthwise thereof, the inner head of each cylinder having valve-controlled inlet- and outlet-ports, a centrally disposed hollow gathering chamber mounted on said wheel and having an outlet-conduit coaxial with the wheel, said chamber having circumferentially positioned inlet-ports, means of communication between said inlet-ports and the outlet-ports of said cylinders, a reservoir having a valve-controlled delivery device, and a flexible conduit opening into said reservoir and having a receiving connection with the outlet-conduit of said gathering-chamber including a stuffing box joint permitting relative rotation of the said chamber and wheel.

3. In combination, a wheel having an apertured felly and elastically tired tread-members positioned movably around it, said tread-members each having bearing-cavities near each end opposite a pair of the felly apertures, cylinders arranged around the wheel containing pistons having stems traversing the felly apertures, the outer terminals of the stems having heads seated in the bearing-cavities of the tread-members for longitudinal movements therein to couple a pair of the cylinders with the tread-member opposite, said cylinders having valve-controlled inlet- and outlet-ports, and a reservoir having means of communication with the outlet-ports of said cylinders, said means including a loose joint with stuffing-box permitting rotation of the wheel relative to the reservoir.

4. In combination, a wheel having an apertured felly and tread-members positioned movably around it, said tread-members each having terminal projections on each side to overlap the abutting ends of adjacent tread-members, with the projections on one side projected oppositely to the projections on the other side, said tread-members having lug stops on opposite sides to be contacted by the inner edges of said projections, whereby radial inward movement of one member may be communicated to the member ahead in the direction of rotation of the wheel, said tread-members having bearing-cavities in their inner faces opposite apertures in said felly, cylinders arranged around the wheel within the felly, pistons in said cylinders having stems traversing the felly apertures and with terminal heads in said bearing-cavities interlocked movably therewith for lengthwise relative movements therein, said cylinders having both inlet- and outlet-ports, controlling-valves in said ports, a chamber in communication with said outlet-ports, and a storage reservoir mounted without the wheel having means of communication with the axial center of said chamber, including a loose connection with stuffing-box permitting rotation of the wheel relative to said means of communication.

In testimony whereof I affix my signature.

ELVIE LANDON.